United States Patent
Son et al.

(10) Patent No.: US 6,933,043 B1
(45) Date of Patent: Aug. 23, 2005

(54) DECORATIVE FLOOR COVERING COMPRISING POLYETHYLENE TEREPHTHALATE FILM LAYER IN SURFACE LAYER AND MANUFACTURING METHOD OF THE SAME

(75) Inventors: Seog-Jae Son, Ulsan (KR); Ha-Soo Jang, Seoul (KR); Hea-Chun Kang, Cheongju (KR)

(73) Assignee: LG Chem, Ltd., Seoul (KR)

( * ) Notice: Subject to any disclaimer, the term of this patent is extended or adjusted under 35 U.S.C. 154(b) by 237 days.

(21) Appl. No.: 10/019,028

(22) PCT Filed: Jun. 26, 2000

(86) PCT No.: PCT/KR00/00664

§ 371 (c)(1),
(2), (4) Date: Dec. 26, 2001

(87) PCT Pub. No.: WO01/00406

PCT Pub. Date: Jan. 4, 2001

(30) Foreign Application Priority Data

Jun. 26, 1999 (KR) .......................................... 1999/24426
Jun. 23, 2000 (KR) .......................................... 2000/34772

(51) Int. Cl.[7] .......................... B32B 7/02; B32B 27/06; B32B 27/36; B32B 27/08; B32B 7/04
(52) U.S. Cl. ...................... 428/215; 428/483; 428/520; 428/913.3; 428/476.6; 428/213; 428/420
(58) Field of Search .............................. 428/151, 913.3, 428/326, 479.6, 445, 403, 404–407, 213, 214, 203, 220

(56) References Cited

U.S. PATENT DOCUMENTS 4,746,560 A * 5/1988 Goeden ....................... 428/151
4,888,233 A * 12/1989 Brew ........................... 428/220
5,492,589 A * 2/1996 Mizuno ....................... 156/280
5,928,778 A * 7/1999 Takahashi et al. ........... 428/323

FOREIGN PATENT DOCUMENTS

| JP | 04-101846 | * 8/1990 | ........... B32B/27/06 |
| JP | 09-151596 | * 11/1995 | ........... B32B/21/08 |
| JP | 08174783 | 7/1996 | |
| JP | 10-339016 | * 12/1998 | ........... E04F/15/02 |
| KR | 94-13816 | 7/1994 | |
| KR | 97-33802 | 7/1997 | |

* cited by examiner

*Primary Examiner*—Terrel Morris
*Assistant Examiner*—Lynda Salvatore
(74) *Attorney, Agent, or Firm*—Baker Botts LLP

(57) ABSTRACT

The present invention provides a decorative floor covering comprising a surface layer and a substrate layer underneath, wherein the surface layer comprises a polyethylene terephthalate film layer, and a method for preparing the same. Furthermore, the present invention provides a decorative floor covering comprising a surface layer and a substrate layer underneath, wherein a light weight back layer is further comprised under the substrate layer, and a method for preparing the same. A decorative floor covering of the present invention is a decorative floor covering which has superior surface heat resistance, printing sharpness and realism, and it can be installed conveniently since not only can non-foamed polyvinyl chloride resin be used as a substrate layer, but also the weight of a floor covering is light when a light weight back layer is comprised under the substrate layer.

13 Claims, 2 Drawing Sheets

DECORATIVE FLOOR COVERING COMPRISING POLYETHYLENE TEREPHTHALATE FILM LAYER IN SURFACE LAYER AND MANUFACTURING METHOD OF THE SAME

CROSS REFERENCE TO RELATED APPLICATION

This application is based on Korean patent application Nos. 10-1999-0024426 and 10-2000-0034772 filed on Jun. 26, 1999 and Jun. 23, 2000 respectively, which are incorporated hereinto by reference.

BACKGROUND OF THE INVENTION (a) Field of the Invention

The present invention relates to a decorative floor covering, more particularly to a decorative floor covering comprising a polyethylene terephthalate film layer in a surface layer, and a manufacturing method of the same.

(b) Description of the Related Art

As demands for convenience and health functions in home environments increase in conjunction with recent income level improvements, the need for light weight decorative floor coverings and various functional products used in a common residence or commercial space tends to be increasing.

A decorative floor covering which is installed in common residences and a semi-commercial spaces provides simple functionalities such as durability, stain resistance and fashion characteristics.

Methods for printing decorative patterns in conventional decorative floor coverings include directly printing patterns on a polyvinyl chloride resin sheet, directly printing patterns on a substrate layer comprising glass fiber etc., and transferring printed patterns on paper or polyester film to a polyvinyl chloride resin sheet surface. However, there have been problems in that these methods do not satisfy human desires for natural patterns without leaving artificial traces. Particularly, although effects of a pattern which is printed on paper or polyester transfer paper is superior, there have been problems in that realism decreases since pattern changes occur after transfer. Furthermore, although a polyvinyl chloride resin layer is formed by to adding fillers to a polyvinyl chloride resin sheet layer to raise the transferring effects since complete transfer does not occur due to transferring surface irregularities, the transferred patterns deteriorate due to the fillers.

Secondly, conventional decorative floor coverings in which an olefin resin skin layer such as a transparent polyvinyl chloride resin, polyethylene, etc. is used on a printing layer so as to protect the printing layer tend to generate microscopic air pockets during processing, so a yellowing phenomenon occurs due to the heat changes during processing. In addition, a certain thickness should be maintained in order to provide durability during use, resulting in the problem that transparency is further deteriorated due to the thickness.

Thirdly, polyvinyl chloride resin has problems of poor heat resistance in that the surface is easily damaged by a heat source of over 100° C. due to its low softening point of 80 to 100° C.

Although there have been cases that non-foaming polyvinyl chloride resin or other materials have been used as a skin layer to improve heat resistance, problems of heat resistance have not been fundamentally solved.

Furthermore, a non-foaming polyvinyl chloride resin layer has been used under a conventional decorative floor covering as a balance layer, and there have been installing problems since the product weight is increased due to the resin layer.

FIG. 1 is a cross-sectional view of a conventional decorative floor covering, wherein a substrate impregnated layer 1 is positioned in the middle, a non-foaming chip layer 21 having a pastel tone and decorative patterns, a durability provided polyvinyl chloride resin skin layer 22, and a durability and heat resistance provided surface treated layer 25 are positioned in order on the substrate impregnated layer 1, and a balance layer 31 which maintains product balance is positioned under the substrate impregnated layer 1.

The above conventional decorative floor coverings are manufactured by a method comprising the steps of heat pressing and gelling after fully impregnating glass fiber, pulp, etc. having large pores into a polyvinyl chloride resin sol to make a substrate impregnated layer 1, forming polyvinyl chloride resin chips on non-foamed chips 21 by applying heat after coating calcium carbonate ($CaCO_3$) contained polyvinyl chloride resin chips having 5 to 7 colors to a thickness of 1.0 to 1.5 mm on the substrate impregnated layer 1 using a rotary screen roll, laying up a transparent polyvinyl chloride resin sheet on the non-foamed chips 21 as a skin layer 22, laying up a calcium carbonate filled polyvinyl chloride resin sheet under the substrate impregnated layer 1 as a balance layer 31, and forming a surface treated layer 25 by curing after coating urethane acryl resin, etc. on the skin layer 22.

The conventional decorative floor coverings having these structures have problems in that realism is decreased in the decorative patterns of the non-foamed chip layer 21, transparency of the durability providing polyvinyl chloride resin skin layer 22 is decreased, and its heat resistance is insufficient.

SUMMARY OF THE INVENTION

It is an object of the present invention to provide a decorative floor covering having a superior heat resistant surface and a method for manufacturing the same, considering problems of the conventional technologies.

It is another object of the present invention to provide a decorative floor covering having superior surface printing sharpness and realism, and a method for manufacturing the same.

It is another object of the present invention to provide a light weight decorative floor covering which can be installed conveniently since non-foamed polyvinyl chloride resin is used as a substrate layer, and a method for manufacturing the same.

In order to accomplish the above objects, the present invention provides a decorative floor covering comprising a surface layer and a substrate layer, wherein the surface layer comprises a polyethylene terephthalate film layer.

Furthermore, the present invention provides a decorative floor covering comprising a surface layer and a substrate layer, wherein a light back layer is further comprised underneath the substrate layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

In the following detailed description, only the preferred embodiments of the invention have been shown and described, simply by way of illustration of the best mode contemplated by the inventor(s) of carrying out the invention. As will be realized, the invention is capable of modification in various obvious respects, all without departing from the invention. Accordingly, the description is to be regarded as illustrative in nature, and not restrictive.

The present invention is described in detail as following.

The present invention is a decorative floor covering downwardly comprising a surface layer 20 with a polyethylene terephthalate film having superior transparency, heat resistance, durability, and chemical resistance, and a polyvinyl chloride substrate layer 10 having a high filler content. That is, it is an aim that at the point when a high temperature is applied to the surface of conventional polymer plastic floor coverings, the high temperature is transferred so that not only do carbonization phenomena not occur, but the heat is transferred very quickly. So, a UV coated polyethylene terephthalate film having superior heat resistance is used in the surface layer 20, and polyvinyl chloride resin having a high filler content is used as a substrate so as to swiftly transfer a high temperature applied to the floor covering surface so that the decorative floor covering surface is not carbonized even at a high temperature. Furthermore, patterns of a decorative floor covering are vividly expressed using superior transparency and printability of a polyethylene terephthalate film.

Therefore, printing sharpness and realism are high and heat resistance is improved in a decorative floor covering of the present invention.

The present invention is described in detail with drawings as follows.

Figure 1:
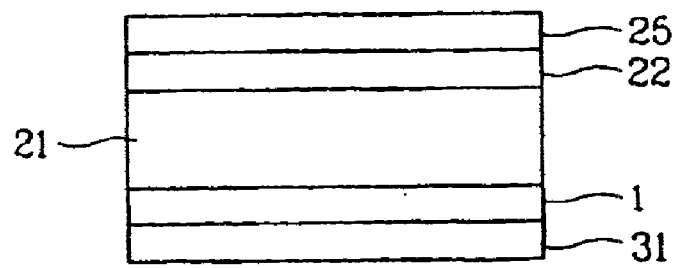
FIG. 1 is a cross-sectional view of a conventional decorative floor covering.
Figure 2:
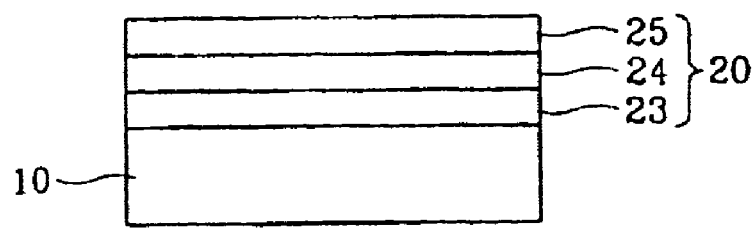
FIG. 2 is a cross-sectional view of the decorative floor covering of EXAMPLE 1.

FIG. 2 is a cross-sectional view illustrating one embodiment of the present invention, wherein a polyvinyl chloride resin substrate layer 10 is disposed in a decorative floor covering, and a surface layer 20 is disposed on the substrate layer 10. The surface layer 20 can be further subdivided. That is, the surface layer 20 comprises a surface treated layer 25 on a polyethylene terephthalate film layer 24, and a polyvinyl chloride resin intermediate layer 23 under that.

A method for manufacturing a decorative floor covering of FIG. 2 basically comprises the steps of:

a) manufacturing a polyvinyl chloride resin substrate layer 10;

b) manufacturing a pressed sheet by laying up a polyvinyl chloride resin intermediate layer 23 on the substrate layer 10, applying pressure, and pressing;

c) manufacturing a half-finished sheet by laying up a polyethylene terephthalate film layer 24 under which a certain pattern is printed on the pressed sheet of step b), applying pressure, and pressing; and d) forming a surface treated layer 25 by UV curing after coating a surface treated layer 25 composition on the half-finished sheet of step c).

In the pressing of step b) and step c), the pressing objects are preferably preheated to a temperature of 140 to 170° C. before laying up, and the applied pressure is preferably from 3 to 10 kgf/cm² during pressing.

The polyvinyl chloride resin substrate layer 10 fulfils its function to dissipate heat applied to the top of the surface layer 20, and it is manufactured by adding a high amount of fillers. Usable fillers include one or more inorganic fillers selected from the group consisting of calcium carbonate, talc, wollastonite, and silica, one or more metallic powders selected from the group consisting of aluminum, copper, and iron, and a mixture thereof. In the fillers used, an inorganic filler is preferably from 50 to 400 weight parts based on 100 weight parts of polyvinyl chloride resin, and a metallic powder is preferably from 5 to 30 weight parts based on 100 weight parts of polyvinyl chloride resin. In order to improve processabilities of a calender, the consumed amount can be increased 2 to 5 times more by processing after premixing a metallic powder, a resin, and a plasticizer than when a metallic powder alone is used.

A preferable method embodiment for manufacturing a polyvinyl chloride resin substrate layer 10 is manufacturing a sheet by adding a plasticizer for reinforcing product flexibility, 30 to 50 weight parts of dioctyl phthalate, heat resistant stabilizers for providing heat resistant stabilities, 3 to 5 weight parts of a barium-zinc based compound and 3 to 5 weight parts of epoxy compound, a filler for providing product hardness and heat resistant dispersibility, 50 to 400 weight parts of calcium carbonate ($CaCO_3$), and 3 to 5 weight parts of pigment for imparting surface colors, to 100 weight parts of polyvinyl chloride resin, fully kneading at a rolling mill at 160 to 190° C., and rolling to a thickness of 0.8 to 1.3 mm.

Preferably 50 to 400 weight parts of a calcium carbonate filler are used based on 100 weight parts of polyvinyl chloride resin since the higher the content of calcium carbonate, not only does the heat conductibility increase, but also press marks caused by heavy objects such as furniture used in everyday life are minimized due to an increased surface hardness. However, when 400 or more weight parts of calcium carbonate are used based on 100 weight parts of polyvinyl chloride resin, the polyvinyl chloride resin does not chemically bond with the calcium carbonate, weakening the cohesion of the polyvinyl chloride resin resulting in a processibility decrease, even though it is profitable in the aspect of manufacturing cost.

Furthermore, glass fiber scrim, or woven or nonwoven long glass fiber 11 can be interposed in the middle of the polyvinyl chloride resin substrate layer 10 for dimensional stability, wherein the interposition method is pressing and applying pressure of 3 to 10 kgf/cm² at an embossing roll under the state of latent heat of 100 to 150° C. after rolling the first polyvinyl chloride resin sheet at a calender. Thereafter, the second polyvinyl chloride resin sheet is pressed under a glass scrim layer, or a woven or nonwoven glass fiber 11, thus interposing it inside a polyvinyl chloride resin substrate layer 10, and the second polyvinyl chloride resin sheet under which a separate light back layer 30, usually a fiber layer 35, can be attached in advance.

Figure 3:
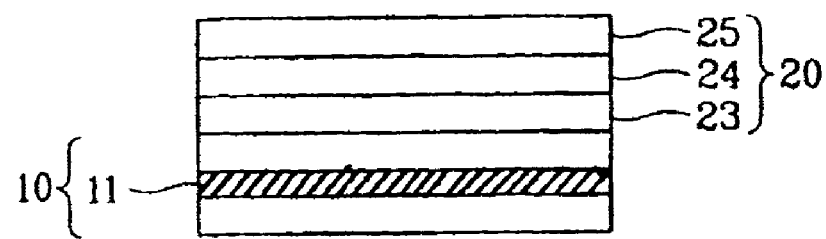
FIG. 3 is a cross-sectional view of a decorative floor covering in which a glass fiber scrim or a woven or nonwoven glass fiberis interposed in the middle of a polyvinyl chloride resin substrate layer of the present invention.
Figure 4:
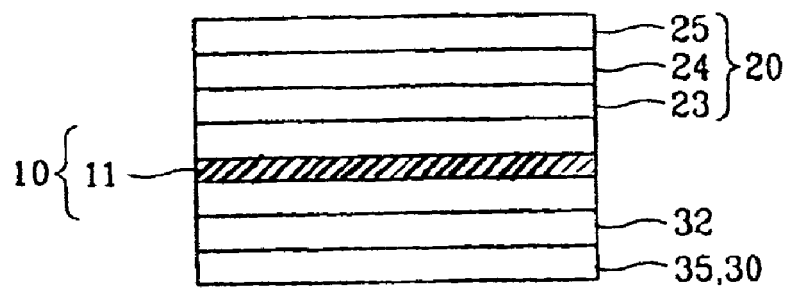
FIG. 4 is a cross-sectional view of the decorative floor covering of EXAMPLE 2.

A structure of a decorative floor covering of the present invention in which a glass fiber scrim or woven or nonwoven glass fiber 11 is interposed in a polyvinyl chloride resin substrate layer 10 is illustrated in FIG. 3 and FIG. 4.

The polyvinyl chloride resin intermediate layer 23, which is used on a polyvinyl chloride resin substrate layer 10 so that color of a substrate layer 10 can be concealed in order to support printed pattern sharpness and realism of an upper surface layer 20 has the additional function of dissipating heat when heat is applied to the upper surface layer 20, and it also transfers heat to the polyvinyl chloride resin substrate layer 10 positioned underneath.

For this, a 0.1 to 1 mm thick sheet is manufactured by rolling a polyvinyl chloride resin composition comprising 100 weight parts of polyvinyl chloride resin, 25 to 50 weight parts of dioctyl phthalate, 50 to 150 weight parts of calcium carbonate, 3 to 5 weight parts of titanium oxide, and 2 to 5 weight parts of heat stabilizer in a calender.

More particularly, after adding 25 to 50 weight parts of dioctyl phthalate plasticizer for reinforcing product flexibility, 2 to 5 weight parts of barium-zinc (Ba—Zn) based stabilizer and 2 to 5 weight parts of epoxy stabilizer heat resistant stabilizers for providing heat resistant stability, 50 to 150 weight parts of inorganic filler such as calcium carbonate etc. for providing product hardness and heat resistant dispersibility, and 3 to 5 weight parts of titanium oxide ($TiO_2$) pigment for making the surface color white, to a main raw material of polyvinyl chloride and sufficiently kneading at a rolling roll at 160 to 190° C., a polyvinyl chloride resin intermediate layer 23 is manufactured by rolling to 0.1 to 1 mm, more preferably to a 0.1 to 0.2 mm thickness in a calender.

The polyethylene terephthalate film layer 24, under which highly realistic and vivid decorative patterns are printed by a printing method such as gravure printing method, etc., is positioned on the polyvinyl chloride resin intermediate layer 33.

It is preferable to use this polyethylene terephthalate film layer 24 after coating a primer selected from the group consisting of polyvinyl acetate based, polyurethane acrylate based, and ethylenevinyl acetate based primers to a coating thickness of 0.1 to 10 $\mu$m for adhesion to an UV surface treated layer 25 positioned at the upper surface of the film layer and to a polyvinyl chloride resin intermediate layer 23 positioned under the film layer.

Printing certain patterns on a polyethylene terephthalate film layer 24 is possible before or after the primer treatment, and the polyethylene terephthalate film layer is used during pressing by winding on a paper pipe, steel pipe, etc. after manufacturing. Furthermore, printing can be done on the polyvinyl chloride resin intermediate layer 23 as opposed to the polyethylene terephthalate film layer 24.

A thickness of a polyethylene terephthalate film layer 24 is preferably from 10 to 100 $\mu$m, because when the polyethylene terephthalate film is thinner than 10 $\mu$m the printing surface is expanded by tension during laying-up, and when it is thicker than 100 $\mu$m product surface folding occurs when the product is folded since polyethylene terephthalate film has low flexibility when it is thicker than 100 $\mu$m.

The surface treated layer 25 which is used to provide stain resistance or durability synergistic effectsis formed by coating an UV surface treated layer 25 composition on the polyethylene terephthalate film layer 24, and curing with ultraviolet rays, etc. A UV surface treated layer 25 composition is preferably selected from the group consisting of urethane acrylate, silicone acrylate, and epoxy acrylate, and preferably further comprising acryl based or urethane based beads having a particle size of 5 to 20 $\mu$m, in order to maintain the heat resistant function. It is cross linking cured with ultraviolet rays or electron beams: urethane acryl resin is cured by ultraviolet ray irradiation depending on composition, and aqueous urethane resin can be cured with heat.

Ease of installation can be provided by additionally using a cork balance layer 33 as a light back layer 30, or a wooden powder balance layer 34, or a fabric layer 35 underneath the polyvinyl chloride resin substrate layer 10, thus reducing the weight of the decorative floor covering while maintaining the same total thickness. The light back layer 30 consisting of a cork balance layer 33, wooden powder balance layer 34, or a fabric layer 35 can provide anti-insect effects, heat insulating effects, a humidity controlling function, and impact absorbing effects as well.

For this, the cork balance layer 33 is manufactured in a sheet which is cut to a thickness of 1.0 to 2.0 mm using a slicing machine after a cork layer of a natural tree is peeled off, and pulverized to a particle size of 5 to 10 meshes, put into a large cylinder together with adhesive, and bonded by applying pressure. A cork having preferably 2% or less moisture content is used since a higher moisture content causes higher contraction or expansion due to heat. A cork balance layer 33 can be manufactured to a thickness of 3.0 to 4.0 mm so as to further improve performance aspects such as sound insulation, impact absorption, etc. This cork balance layer 33 can improve the installation property of product weight since its specific gravity is over 8 to 10 times less than a polyvinyl chloride resin sheet containing general inorganic materials.

Furthermore, the wooden powder balance layer 34 which maintains the product balance and provides anti-insect effects, heat insulating effects, a humidity controlling function, impact absorbing effects, etc. is manufactured in a sheet which is rolled to a thickness of 0.8 to 1.0 mm using a two sets of pressure rolls after adding 100 to 150 weight parts of wooden powder having a particle size of 200 to 300 meshes, 3 to 5 weight parts of heat resistant barium-zinc based compound as a stabilizer, 1 to 3 weight parts of internal antiadditive stearic acid, 30 to 50 weight parts of plasticizer dioctyl phthalate, and 3 to 5 weight parts of other pigment to 100 weight parts of polyvinyl chloride resin, and kneading it together, wherein the wooden powder is coating treated to prevent moisture absorption with 30 to 50 weight % of surfactant, based on the wooden powder weight. Polyethylene glycol, polybutyl glycol, polymethyl glycol, polymethyl propylene glycol, etc. can be used as a surfactant. Furthermore, surfactants having preferably 2% or less moisture content are used since severe contraction or expansion by heat can occur when moisture content is higher. The wooden powder balance layer 34 can be manufactured to a thickness of 3,0 to 4.0 mm to further improve functionality aspects such as sound insulation, impact absorption, etc. This wooden powder balance layer 34 can improve the installation property of product weight since its specific gravity is over 8 to 10 times less than a polyvinyl chloride resin sheet containing general inorganic materials.

Furthermore, the fiber layer 35 which prevents product deformation by dimensional change and provides the product with lightness uses woven or nonwoven polyester, woven or nonwoven polypropylene, woven or nonwoven glass fiber, etc. This fabric layer 35 is used by fixing it with an adhesive after coating a plastisol such as polyvinyl chloride, etc. under the polyvinyl chloride resin substrate layer 10, and simultaneously gelling the sol and pressing with the fiber layer 35, or preparing it under the cork balance layer 33 or the wooden powder balance layer 34. The woven thickness of the fiber layer 35 is preferably from 10 s×10 s to 25 s×15 s, and the density is preferably from 20×20 to 30×30 roll/inch.

This light back layer 30 is adhered under the polyvinyl chloride resin substrate layer 10 using an adhesive. The adhesive layer 32 is preferably a sheet or impregnated sheet which is rolled to a thickness of 0.03 to 0.2 mm by a 4 roll calender roll or an extruder at a temperature of 80 to 160° C. using urethane resin, acryl resin, vinyl acetate, resin, etc. considering the melting point of each resin, and a light back layer 30 can be adhered by separately coating a plastisol such as polyvinyl chloride, etc. under a polyvinyl chloride resin substrate layer 10 and using this gelled sol. In case of using a rolled sheet or an impregnated sheet as an adhesive layer 32, a pressed product or half-finished product to be adhered is preheated, an adhesive layer 32 is positioned under a substrate layer 10, laid up, and pressed with a pressure of 3 to 10 kg/cm$_2$.

A decorative floor covering of the present invention is manufactured by the various manufacturing methods depending on the application method of the light back layer 30. These manufacturing methods can be represented in the following various embodiments in addition to the above described basic manufacturing method.

One embodiment of a manufacturing method of a decorative floor covering of the present invention comprises the steps of:

a) manufacturing the first polyvinyl chloride resin substrate layer 10;

b) pressing by applying pressure in a embossing roll after positioning a glass fiber scrim or a woven or unwoven glass fiber 11 underneath the first substrate layer 10 under the condition that a surface of the first polyvinyl chloride resin substrate layer 10 of step a) maintains latent heat of 100 to 150° C.;

c) manufacturing the second polyvinyl chloride resin substrate layer 10;

d) coating a plastisol underneath the second polyvinyl chloride resin substrate layer 10, positioning a light back layer 30 of a fiber layer 35, applying pressure, and pressing with a press roll at a heating drum at 140 to 150° C.;

e) manufacturing a polyvinyl chloride resin intermediate layer 23;

f) manufacturing a pressed sheet by applying pressure at a press after downwardly positioning a polyvinyl chloride resin intermediate layer 23, the first polyvinyl chloride resin substrate layer 10 under which glass fiber scrim, or woven or unwoven glass fiber 11 is pressed, the second polyvinyl chloride resin substrate layer 10 under which a light back layer 30 of a fiber layer 35 is pressed, and preheating to a temperature of 140 to 170° C.;

g) manufacturing a half-finished sheet by applying pressure and pressing at an embossing roll after preheating the pressed sheet of step f) to a temperature of 140 to 170° C. and positioning a polyethylene terephthalate film layer 24 on a polyvinyl chloride resin intermediate layer 23; and h) forming a surface treated layer 25 by UV (ultraviolet ray) curing after coating a surface treated layer 25 composition on the half-finished sheet of step g).

Another embodiment of a manufacturing method of a decorative floor covering of the present invention comprises the steps of:

a) manufacturing a polyvinyl chloride resin substrate layer 10;

b) laying up a polyvinyl chloride resin intermediate layer 23 on the preheated substrate layer 10 of step a), applying pressure, and pressing;

c) manufacturing a half-finished sheet by laying up a polyethylene terephthalate film layer 24 on the preheated polyvinyl chloride resin intermediate layer 23 of step b), applying pressure, and pressing;

d) laying up an adhesive layer 32 underneath the preheated half-finished sheet of step c), applying pressure, and pressing;

e) laying up a light back layer 30 underneath the adhesive layer 32 of step d), applying pressure, and pressing; and f) forming a surface treated layer 25 after coating a surface treated layer 25 composition on the pressed polyethylene terephthalate film layer 24 of step e), and curing.

In the manufacturing method, a method for laying up and pressing a light back layer 30 can be selected from a method for laying up and pressing a fabric layer 35 underneath a wooden powder balance layer 34 after laying up and pressing a cork balance layer 33 underneath an adhesive layer 32, or laying up and pressing a wooden powder balance layer 34 underneath an adhesive layer 32.

In the manufacturing methods, the preheating in each step is carried out at a temperature preferably from 140 to 170° C. considering the melting point of polyvinyl chloride resin, and an applying pressure during pressing after preheating is preferably from 3 to 10 kg/cm$_2$.

A surface treated layer 25, a polyethylene terephthalate film layer 24, a polyvinyl chloride resin intermediate layer 23, a substrate layer 10, and an adhesive layer 32 in a decorative floor covering of the present invention are manufactured in a thickness preferably from 1 to 1.5 mm.

The present invention is described further in detail through the following EXAMPLES and COMPARATIVE EXAMPLES. However, the following EXAMPLES are only for exemplifying the present invention, and the present invention is not limited to the following EXAMPLES.

EXAMPLES

Example 1

(Manufacturing of a polyvinyl chloride resin substrate layer 10)

A polyvinyl chloride resin substrate layer 10 sheet having a thickness of 0.75 mm was manufactured by kneading 100 weight parts of polyvinyl chloride resin having a degree of polymerization of 1000, 42 weight parts of dioctyl phthalate, 250 weight parts of calcium carbonate powder, and 2 weight parts of heat resistant stabilizer in a Banbury mixer, and rolling the softened and molten compound with a calender at 130 to 170° C.

(Manufacturing of a polyvinyl chloride resin intermediate layer 23)

A polyvinyl chloride resin intermediate layer 23 sheet having a thickness of 0.1 mm was manufactured by kneading 100 weight parts of polyvinyl chloride resin having a degree of polymerization of 1000, 38 weight parts of dioctyl phthalate, 90 weight parts of calcium carbonate powder, 2.5 weight parts of heat resistant stabilizer, and 10 weight parts of titanium oxide in a Banbury mixer, and rolling the softened and molten compound with a calender at 130 to 170° C.

(Pressing of a polyvinyl chloride resin intermediate layer 23)

After preheating the manufactured polyvinyl chloride resin substrate layer 10 sheet at a temperature of 150 to 170° C., a polyvinyl chloride resin intermediate layer 23 was positioned on the preheated substrate layer 10, laid up, and pressed at a pressure of 3 to 6 kg/cm².

(Manufacturing of a polyethylene terephthalate film layer 24)

Certain patterns were imparted in the gravure printing method under a polyethylene terephthalate film (SG88 manufactured by SK Corporation) having a thickness of 50 µm on both sides of which an acryl and polyester based primer is treated to an average thickness of 0.5 µm.

(Pressing of a polyethylene terephthalate film layer 24)

After preheating a sheet in which a polyvinyl chloride resin intermediate layer 23 was pressed on the manufactured polyvinyl chloride resin substrate layer 10 sheet at a temperature of 150 to 170° C., the polyethylene terephthalate film layer 24 under which certain patterns were imparted was positioned on the preheated sheet, laid up, and pressed at a pressure of 3 to 6 kg/cm².

(Heat resistant UV (ultraviolet rays) coating treatment)

A urethane acrylate based heat resistant UV treating agent in which a heat resistant stabilizer and acryl beads were added and contained was coated on the polyethylene terephthalate film layer 24 pressed sheet to a coating thickness of 25 µm cured by an UV lamp in the non-oxygen curing method, thus forming a heat resistant UV coating layer 25 on the uppermost layer. This manufactured decorative floor covering is illustrated in FIG. 2.

Example 2

(Manufacturing of a polyvinyl chloride resin substrate layer 10)

The same polyvinyl chloride resin substrate layer 10 sheet as in the EXAMPLE 1 was manufactured.

(Attaching of woven cloth 30)

After coating a polyvinyl chloride sol (plastisol) under the polyvinyl chloride resin substrate layer 10 sheet, a polyester woven cloth (thickness: 20 s×20 s, density: 25×25/inch) was positioned and pressed with a press roll at a heating drum at 140 to 150° C.

(Pressing of glass fiber scrim 11)

One polyvinyl chloride resin substrate layer 10 sheet was additionally manufactured by rolling a polyvinyl chloride substrate layer 10 sheet using a calender in the same method as in the EXAMPLE 1, and pressed by applying pressure while passing the sheet and glass fiber scrim (average weight of 200 g/m²) which is positioned underneath the sheet through an embossing roll (pressure of 10 kgf/cm²) in the state of sheet formation, i.e., in the state that a latent sheet surface temperature of 100 to 120° C. is maintained.

(Manufacturing of a polyvinyl chloride resin intermediate layer 23)

The same polyvinyl chloride resin intermediate layer 23 as in the EXAMPLE 1 was manufactured.

Each of a polyvinyl chloride intermediate layer 23, a polyvinyl chloride resin substrate layer 10 sheet under which a glass fiber scrim 11 is pressed, and a polyvinyl chloride resin substrate layer 10 sheet under which polyester woven cloth is pressed were respectively preheated to a temperature of 140 to 170° C., downwardly positioned in order, laid up, and pressed by passing through an embossing roll at 160° C. (pressure of 10 kgf/cm²).

(Manufacturing of a polyethylene terephthalate film layer 24)

The same polyethylene terephthalate film layer 24 as in the EXAMPLE 1 was prepared.

(Pressing of a polyethylene terephthalate film layer 24)

After preheating the manufactured pressed sheet at a temperature of 150 to 170° C., the polyethylene terephthalate film layer 24 under which certain patterns were imparted was positioned on the preheated sheet, laid up, and pressed at a pressure of 3 to 6 kgf/cm².

(Heat resistant UV coating treatment)

An urethane acrylate based heat resistant UV treating agent in which a heat resistant stabilizer and acryl beads were added and contained was coated on the polyethylene terephthalate film layer 24 pressed sheet to a coating thickness of 25 µm, cured by an UV lamp in the non-oxygen curing method, thus forming a heat resistant UV coating layer 25 on the uppermost layer. The final product thickness was 1.8 mm. This manufactured decorative floor covering is illustrated in FIG. 4.

Example 3

(Manufacturing of a polyvinyl chloride resin substrate layer 10)

The same polyvinyl chloride resin substrate layer 10 as in the EXAMPLE 1 was manufactured.

(Manufacturing of a polyvinyl chloride resin intermediate layer 23)

The same polyvinyl chloride resin intermediate layer 23 as in EXAMPLE 1 was manufactured.

(Pressing of a polyvinyl chloride resin intermediate layer 23)

A polyvinyl chloride resin intermediate layer 23 sheet was pressed on a substrate layer 10 in the same method as in EXAMPLE 1.

(Manufacturing of a polyethylene terephthalate film layer 24)

The same polyethylene terephthalate film layer 24 as in the EXAMPLE 1 was manufactured.

(Pressing of a polyethylene terephthalate film layer 24)

A half-finished sheet was manufactured by pressing the polyethylene terephthalate film layer 24 on a sheet in which a polyvinyl chloride resin intermediate layer 23 was pressed on the polyvinyl chloride resin substrate layer 10 manufactured in the same method as in EXAMPLE 1.

(Manufacturing an adhesive layer 32)

A 0.1 mm thick adhesive layer 32 was manufactured by rolling vinylacetate resin using a 4 roll calender at 120° C.

(Pressing of an adhesive layer 32)

After preheating the polyethylene terephthalate film layer 24 pressed half-finished sheet at a temperature of 150 to 170° C. the adhesive layer 32 was positioned under the preheated half-finished sheet, laid up, and pressed at a pressure of 3 to 6 kg/cm².

(Manufacturing of a cork balance layer 33)

A sheet which was cut to a thickness of 1 mm with a slicing machine after a cork layer of a natural tree was peeled off, pulverized to a particle size of 5 to 10 meshes, put into a large cylinder together with 5 weight % of vinyl acetate adhesive per cork weight, and bonded by applying pressure.

(Pressing of a cork balance layer 33)

The cork balance layer 33 was positioned underneath a half-finished sheet under which the adhesive layer 32 is pressed, laid up and pressed at a pressure of 3 to 6 kg/cm².

(Heat resistant UV coating treatment)

Figure 5:
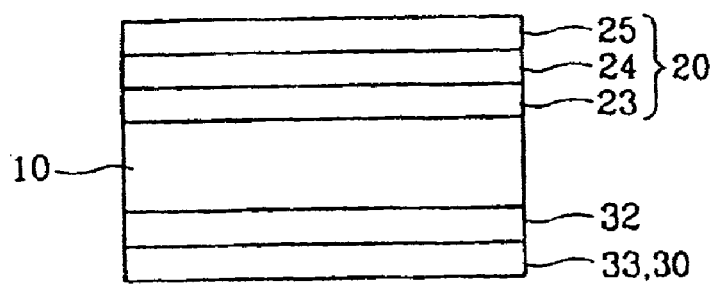
FIG. 5 is a cross-sectional view of the decorative floor covering of EXAMPLE 3.

An urethane acrylate based heat resistant UV treating agent in which a heat resistant stabilizer and acryl beads were added and contained was coated on the pressed sheet to a coating thickness of 25 μm, cured by an UV lamp in the non-oxygen curing method, thus forming a heat resistant UV coating layer 25 on the uppermost layer. The final product thickness was 2.0 mm. This manufactured decorative floor covering is illustrated in FIG. 5.

Example 4

(Manufacturing of a polyvinyl chloride resin substrate layer 10)

The same polyvinyl chloride resin substrate layer 10 as in the EXAMPLE 1 was manufactured.

(Manufacturing of a polyvinyl chloride resin intermediate layer 23)

The same polyvinyl chloride resin intermediate layer 23 as in EXAMPLE 1 was manufactured.

(Pressing of a polyvinyl chloride resin intermediate layer 23)

A polyvinyl chloride resin intermediate layer 23 sheet was pressed on a substrate layer 10 in the same method as in EXAMPLE 1.

(Manufacturing of a polyethylene terephthalate film layer 24)

The same polyethylene terephthalate film layer 24 as in the EXAMPLE 1 was manufactured.

(Pressing of a polyethylene terephthalate film layer 24)

A half-finished sheet was manufactured by pressing the polyethylene terephthalate film layer 24 on a sheet in which a polyvinyl chloride resin intermediate layer 23 was pressed on the polyvinyl chloride resin substrate layer 10 manufactured in the same method as in EXAMPLE 1.

(Manufacturing an adhesive layer 32)

A 0.1 mm thick adhesive layer 32 was manufactured by rolling vinylacetate resin using a 4 roll calender at 120° C.

(Pressing of an adhesive layer 32)

After preheating the polyethylene terephthalate film layer 24 pressed half-finished sheet at a temperature of 150 to 170° C., the adhesive layer 32 was positioned under the preheated half-finished sheet, laid up, and pressed at a pressure of 3 to 6 kg/cm².

(Manufacturing of a wooden powder balance layer 34)

A wooden powder balance layer 34 sheet was rolled to a thickness of 1 mm using a two sets of pressure rolls at a temperature of 130 to 170° C. after kneading 100 weight parts of polyvinyl chloride resin, 150 weight parts of wooden powder having a particle size of 200 to 300 meshes, 5 weight parts of heat resistant stabilizer barium-zinc based compound, 1 weight part of internal antiadditive stearic acid, 30 weight parts of plasticizer dioctyl phthalate, and 5 weight parts of pigment.

(Pressing of a cork balance layer 33)

The wooden powder balance layer 34 was positioned underneath a half-finished sheet under which the adhesive layer 32 was pressed, laid up, and pressed at a pressure of 3 to 6 kg/cm².

(Manufacturing of fiber layer 35)

A polyvinyl chloride sol (plastisol) coated polyester non-woven (thickness: 20 s×20 s, density: 25×25/inch) was prepared.

(Pressing of a fiber layer 35)

The fiber layer 35 was positioned underneath a half-finished sheet under which the cork balance layer 33 was pressed, laid up, and pressed at a pressure of 3 to 6 kg/cm².

(Heat resistant UV coating treatment)

Figure 6:
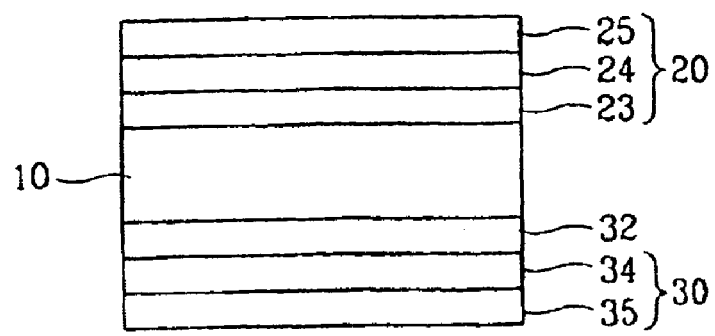
FIG. 6 is a cross-sectional view of the decorative floor covering of EXAMPLE 4.

An urethane acrylate based heat resistant UV treating agent in which a heat resistant stabilizer and acryl beads were added and contained was coated on the pressed sheet to a coating thickness of 25 μm, cured by an UV lamp in the non-oxygen curing method, thus forming a heat resistant UV coating layer 25 on the uppermost layer. The final product thickness was 2.0 mm. This manufactured decorative floor covering is illustrated in FIG. 6.

COMPARATIVE EXAMPLE 1

2.3 mm Thick Polyvinyl Chloride Resin Decorative Cushion Floor Covering

As a conventional 2.3 mm thick polyvinyl chloride resin decorative cushion floor covering, a Woodleum Plus product manufactured by LG Chemical Ltd. downwardly comprising an UV coating layer, a transparent layer, a printing layer, an upper foaming layer, a substrate layer, an underneath foaming layer, and a sizing layer was prepared.

The Woodleum Plus product was manufactured by the following method.

(Manufacturing of a substrate layer 10)

A substrate layer was manufactured by gelling at a temperature of 150 to 230° C. after depositing a sol made by mixing 100 weight parts of polyvinyl chloride resin having a degree of polymerization of 2000, 10 to 100 weight parts of plasticizer, 1 to 20 weight parts of stabilizer, 1 to 20 weight parts of pigment, 1 to 50 weight parts of calcium carbonate, and other additives on a substrate such as glass fiber, vellum paper, or mineral material paper.

(Manufacturing of an upper foaming layer)

An upper foaming layer was manufactured by foaming at 170 to 250° C. for 30 to 180 seconds after coating a sol made by mixing 100 weight parts of polyvinyl chloride resin having a degree of polymerization of 2000, 10 to 120 weight parts of plasticizer, 1 to 20 weight parts of stabilizer, 1 to 20 weight parts of pigment, 1 to 20 weight parts of foaming agent, and other additives to a thickness of 0.1 to 0.2 mm on the substrate layer.

(Manufacturing of a printing layer and a transparent layer)

A printing layer was formed by printing certain patterns on the upper foaming layer using a gravure or offset ink, a rotary screen, and a transparent layer was manufactured by gelling at 170 to 230° C. for 30 to 180 seconds after coating a sol made by mixing 100 weight parts of polyvinyl chloride resin having degree of polymerization of 2000, 10 to 150 weight parts of plasticizer, 1 to 20 weight parts of stabilizer, and other additives to a thickness of 0.2 to 0.25 mm on the printing layer.

(Pressing of an underneath foaming layer and a sizing layer)

An underneath foaming layer was manufactured by foaming at 170 to 250° C for 30 to 180 seconds after coating a sol made by mixing 100 weight parts of polyvinyl chloride resin having a degree of polymerization of 2000, 10 to 120 weight parts of plasticizer, 1 to 20 weight parts of stabilizer, 1 to 20 weight parts of pigment, 1 to 20 weight parts of foaming agent, and other additives to a thickness of 0.1 to 0.2 mm on the substrate layer, and a sizing layer was manufactured by gelling at 170 to 230° C. for 30 to 180 seconds after coating a sol made by mixing 100 weight parts of polyvinyl chloride resin having degree of polymerization of 2000, 10 to 120 weight parts of plasticizer, 1 to 20 weight parts of pigment, 1 to 20 weight parts of stabilizer, 1 to 100 weight parts of calcium carbonate, and other additives to a thickness of 0.1 to 0.5 mm on the underneath foaming layer.

(Manufacturing an UV layer)

A UV layer was manufactured by UV curing unsaturated polyester resin, urethane acryl resin, epoxy acrylate resin, or polyester acryl resin on the transparent layer.

COMPARATIVE EXAMPLE 2

A Decorative Floor Covering Comprising a 3.0 mm Thick Polyvinyl Chloride Resin Layer As a conventional decorative floor covering comprising a 3.0 mm thick polyvinyl chloride resin layer, a Deco Tile manufactured by LG Chemical Ltd. downwardly comprising an UV layer, a transparent film layer, a printing layer, an intermediate layer, a base layer, and a back layer was prepared.

(Manufacturing of a transparent film layer)

A 0.2 to 0.3 mm thick transparent sheet was manufactured by mixing 100 weight parts of polyvinyl chloride resin having a degree of polymerization of 800 to 1000, 10 to 40 weight parts of plasticizer, 1 to 20 weight parts of stabilizer, and other additives, and sheeting in the continuous calendaring method.

(Manufacturing an UV layer)

An UV layer was manufactured by UV curing unsaturated polyester resin, urethane acryl resin, epoxy acrylate resin, or polyester acryl resin on the transparent layer.

(Structure of other layers)

Other underneath layers were manufactured by an ordinary method, i.e., continuously calendaring non-foaming sheet layers, whereby each layer was manufactured by heat pressing at a temperature of 130 to 160° C.

The product thickness was 3 mm, and the thickness of a surface skin layer from an uppermost layer, i.e., an UV layer to a transparent film layer was 0.25 mm.

COMPARATIVE EXAMPLE 3

1.8 mm Thick Polyvinyl Chloride Resin Non Foaming Decorative Floor Covering

As a conventional 1.8 mm thick polyvinyl chloride resin non foaming decorative floor covering, a Luckstrong manufactured by LG Chemical Ltd. downwardly comprising an UV layer, a transparent skin layer, a chip layer, a substrate layer, a base sol layer, and a back layer was prepared.

The Luckstrong product was manufactured by the following method.

(Manufacturing of a substrate layer)

A substrate layer was manufactured by gelling at a temperature of 150 to 200° C. after depositing a sol made by mixing 100 weight parts of polyvinyl chloride resin having a degree of polymerization of 2000, 10 to 100 weight parts of plasticizer, 1 to 20 weight parts of stabilizer, 1 to 150 weight parts of calcium carbonate, and other additives on a substrate such as glass fiber, vellum paper, or mineral material paper.

(Manufacturing of a base sol layer and a chip layer)

After manufacturing a base sol layer by coating a sol made by mixing 100 weight parts of polyvinyl chloride resin having a degree of polymerization of 2000, 10 to 50 weight parts of plasticizer, 1 to 20 weight parts of stabilizer, 1 to 20 weight parts of pigment, 1 to 50 weight parts of calcium carbonate, and other additives to a thickness of 0.1 to 0.2 mm on the substrate layer, a chip layer was manufactured by arranging on the base sol layer chips having a size of 8×9 mm which were prepared after manufacturing a 0.8 to 1.2 mm thick transparent sheet by mixing 100 weight parts of polyvinyl chloride resin having a degree of polymerization of 800 to 1000, 10 to 40 weight parts of plasticizer, 1 to 20 weight parts of stabilizer, 50 to 200 weight parts of calcium carbonate, 1 to 5 weight parts of pigment, and other additives, and sheeting in the continuous calendaring method.

(Manufacturing of a transparent skin layer)

A transparent skin layer was manufactured by gelling at 170 to 230° C. after coating a sol made by mixing 100 weight parts of polyvinyl chloride resin having a degree of polymerization of 1700 to 2000, 10 to 50 weight parts of plasticizer, 1 to 5 weight parts of stabilizer, and other additives to a thickness of 0.1 to 0.2 mm on the chip layer.

(Manufacturing an UV layer)

An UV layer was manufactured by UV curing unsaturated polyester resin, urethane acryl resin, epoxy acrylate resin, or polyester acryl resin on the transparent layer.

(Pressing of a back layer)

A back layer was manufactured by pressing with heat and pressure after manufacturing a 0.8 to 1.2 mm thick transparent sheet by mixing 100 weight parts of polyvinyl chloride resin having a degree of polymerization of 800 to 1000, 10 to 40 weight parts of plasticizer, 1 to 20 weight parts of stabilizer, 50 to 200 weight parts of calcium carbonate, 1 to 5 weight parts of pigment, and other additives, and sheeting in the continuous calendaring method.

COMPARATIVE EXAMPLE 4

3.5 mm Thick Polyvinyl Chloride Resin Decorative Cushion Floor Covering

As a conventional 3.5 mm thick polyvinyl chloride resin decorative cushion floor covering, a Sharpeny product manufactured by LG Chemical Ltd. downwardly comprising an UV layer, a transparent layer, a printing layer, an upper foaming layer, a substrate layer, and a mechanical foaming layer was prepared.

The Sharpeny product was manufactured by the following method.

(Manufacturing of a substrate layer)

A substrate layer was manufactured by gelling at a temperature of 150 to 230° C. after depositing a sol made by mixing 100 weight parts of polyvinyl chloride resin having a degree of polymerization of 2000, 10 to 100 weight parts of plasticizer, 1 to 20 weight parts of stabilizer, 1 to 20 weight parts of pigment, 1 to 50 weight parts of calcium carbonate, and other additives on a substrate such as glass fiber, vellum paper, or mineral material paper.

(Manufacturing of an upper foaming layer)

An upper foaming layer was manufactured by foaming at 170 to 250° C. for 30 to 180 seconds after coating a sol made by mixing 100 weight parts of polyvinyl chloride resin having a degree of polymerization of 2000, 10 to 120 weight parts of plasticizer, 1 to 20 weight parts of stabilizer, 1 to 20 weight parts of pigment, 1 to 20 weight parts of foaming agent, and other additives to a thickness of 1.0 to 2.0 mm on the substrate layer.

(Manufacturing of a printing layer and a transparent layer)

A printing layer was formed by printing certain patterns on the upper foaming layer using a gravure or offset ink, a rotary screen, and a transparent layer was manufactured by gelling at 170 to 230° C. for 30 to 180 seconds after coating a sol made by mixing 100 weight parts of polyvinyl chloride resin having a degree of polymerization of 2000, 10 to 150 weight parts of plasticizer, 1 to 20 weight parts of stabilizer, and other additives to a thickness of 0.2 to 0.25 mm on the printing layer.

(Manufacturing of a mechanical foaming layer)

After manufacturing a sol by mixing 100 weight parts of polyvinyl chloride resin having a degree of polymerization of 1100 to 2000, 60 to 80 weight parts of plasticizer, 0 to 30 weight parts of calcium bicarbonate, 2 to 3 weight parts of stabilizer, and other additives, and putting the sol into a mechanical foaming layer, and manufacturing a cream having a density of 0.3 to 0.7 g/cm$^2$ by high speed agitating at 200 to 400 rpm while injecting air at 5 to 8 bar, a mechanical foaming layer was manufactured by coating the cream to a thickness of 2 to 3 mm on the substrate layer, and gelling at 160 to 200° C.

(Manufacturing an UV layer)

An UV layer was manufactured by UV curing unsaturated polyester resin, urethane acryl resin, epoxy acrylate resin, or polyester acryl resin on the transparent layer.

Example 5

(Transparency comparison)

In order to confirm vividness of printed patterns and transparency of a polyethylene terephthalate film layer 24 of the present invention, haze values of transparency of the polyethylene terephthalate film layer 24 of the present invention and conventional polyvinyl chloride sheet layer were measured more than 5 times by the method of ASTM D-1003, and their average values are represented in the following Table 1.

A polyethylene terephthalate film (SG88 manufactured by SK Chemical Ltd.) was used in a polyethylene terephthalate film of the present invention, a comparison polyvinyl chloride sheet was manufactured after manufacturing a sol by mixing 100 weight parts of polyvinyl chloride resin having a degree of polymerization of 2000, 10 to 50 weight parts of plasticizer, 1 to 20 weight parts of stabilizer, and other additives, coating the sol to a thickness of 0.2 mm, and gelling in an oven at 200° C., and the collected films of the sheet were used as samples.

TABLE 1

| Classification | Polyvinyl chloride sheet | Polyethylene terephthalate film |
| --- | --- | --- |
| Haze value | 35 to 45 | 3 to 5 |

Transparency results on sheets

It can be found from the results that a polyethylene terephthalate film of the present invention has 10 or more times superior transparency than a polyvinyl chloride sheet. Therefore, since polyethylene terephthalate film has good transparency and uniform surface conditions, printing sharpness, realism, etc., and it can be raised in a decorative floor covering in which patterns printed, this polyethylene terephthalate film was used in a surface layer 20.

Example 6

(Heat resistance test)

After installing a conventional 2.3 mm thick polyvinyl chloride resin decorative cushion floor covering, Woodleum Plus, of the COMPARATIVE EXAMPLE 1 and a 1.8 mm thick decorative floor covering of the EXAMPLE 2 on a general cement floor surface, it was measured whether damage of the product surface was shown per a period of time in the conditions that a lit cigarette and an unglazed earthenware bowl were put on each sample.

The results are represented in the following Table 2.

TABLE 2

Heat resistance results per each structures

| Classification | | A decorative floor covering of COMPARATIVE EXAMPLE 1 | A decorative floor covering EXAMPLE 2 | Test conditions |
| --- | --- | --- | --- | --- |
| Lit cigarette | When left laid parallel to a product | Carbonization after 30 seconds | No damages by 5 minutes | Tested with cigarettes having a size of 8 mm (diameter) × 83 mm (length) |
| | When a cigarette is crushed out | carbonized | No damages | |
| an unglazed earthenware bowl | | Damaged after 3 seconds | Satisfactory until cooled | Tested by leaving boiling unglazed earthenware bowl on a product |

It can be found from the results of the Table 2 that decorative floor coverings using a polyethylene terephthalate film 24 of the present invention and a polyvinyl chloride sheet substrate layer 10 containing a high content of a filler have superior heat resistance.

Example 7

(Durability(abrasion resistance) test)

An abrasion amount of a surface skin layer having a thickness of 0.25 mm in a decorative floor covering having a conventional polyvinyl chloride resin layer, that is, a Deco Tile of COMPARATIVE EXAMPLE 2 was measured and compared to an abrasion amount of a polyethylene terephthalate film layer 24 having a thickness of 0.05 mm in a decorative floor covering of EXAMPLE 2 of the present invention, using a Taber abrasion test machine in accordance with KSF 2813 (the abrasion testing method of construction materials and composing components) in order to confirm durability of a decorative floor covering of the present invention.

The results are represented in the following Table 3.

TABLE 3

Abrasion resistance tests for each structure

| Classification | Decorative floor covering of COMPARATIVE EXAMPLE 2 | Decorative floor covering of EXAMPLE 2 |
| --- | --- | --- |
| Abrasion amout (g) | 0.61 | 0.047 |
| 0.1 mm thickness converted abrasion amount (g) | 0.2 | 0.1 |

It could be found that a decorative floor covering of the present invention was improved in durability two or more times compared to a decorative floor covering having a conventional polyvinyl chloride resin layer from the results shown in the above Table 3.

Example 8

(Weight comparison)

A weight per m$^2$ was 3.24 kg when a non-foaming decorative floor covering having a thickness of 2.0 mm was manufactured in COMPARATIVE EXAMPLE 3, while a weight per m$^2$ was 2.15 kg when a decorative floor covering having a thickness of 2.0 mm was manufactured in EXAMPLE 3 of the present invention, confirming that 33.6% of weight reduction was realized in a decorative floor covering of the present invention compared to a conventional non-foaming decorative floor covering.

Furthermore, insect repelling effects, heat insulating effects, a humidity controlling function, impact absorbing effects, and sound blocking effects in addition to the weight reduction can be expected from using a cork balance layer 33 in a back layer, and insect repelling effects, heat insulating effects, a humidity controlling function, and impact absorbing effects can be expected from using a wooden powder balance layer 34 in a back layer.

Example 9

(Sound blocking test)

After installing a 2.3 mm thick conventional vinyl cushion decorative floor covering of the COMPARATIVE EXAMPLE 1, a 1.8 mm thick conventional non-foaming vinyl cushion decorative floor covering of the COMPARATIVE EXAMPLE 3, and a 2.0 mm thick decorative floor covering of the EXAMPLE 3 on a 150 mm thick standard concrete slab, the sound blocking performance for a light floor covering impact was measured in accordance with KSF 2810 (the measuring method of floor impact sound at the building site) in order to confirm sound blocking effects of a decorative floor covering, and the measurement results are represented in the following Table 4.

TABLE 4

Sound blocking performance results on each structures

| Structure | L-class | L-index | Single evaluation index (dB(A)) | Improved amount of sound blocking performance |
|---|---|---|---|---|
| Standard concrete slab (150 mm) | L-75 | 74 | 75 | Standard |
| Standard concrete slab (150 mm) + a decorative floor covering of COMPARATIVE EXAMPLE 1 (thickness 2.3 mm) | L-65 | 66.9 | 66.9 | Δ8.1 |
| Standard concrete slab (150 mm) + a non-foaming decorative floor covering of COMPARATIVE EXAMPLE 3 (thickness 1.8 mm) | L-65 | 66.9 | 66.9 | Δ8.1 |
| Standard concrete slab (150 mm) + a decorative floor covering of EXAMPLE 3 (thickness 2.0 mm) | L-50 | 50.1 | 50.1 | Δ24.9 |

In the above Table 4, L-class represents a class showing a sound blocking degree according to the Japanese Industrial Standards, L-index represents showing a sound blocking degree according to the standards prepared by Korea National Housing Corporation, and single evaluation index represents a sound blocked sound pressure level.

It could be confirmed from the above Table 4 that a decorative floor covering of the present invention had superior sound blocking effects.

Example 10

(Indentation test)

After applying a pressure with an indentation testing machine, an equipment of which the front end is a 6.3 mm hemispheric steel rod capable of applying a 133 N (13.6 kgf) load, for one minute in accordance with KSM 3506 (regulation on a vinyl floor sheet for a building molded of a main raw material of polyvinyl chloride resin) in order to confirm impact absorbing effects of a decorative floor covering of the present invention, a indentation depth was measured by a dial gauge.

Indentation depths of a 2.3 mm thick conventional vinyl cushion decorative floor covering of the COMPARATIVE EXAMPLE 1, a 1.8 mm thick conventional polyvinyl chloride resin non-foaming decorative floor covering of COMPARATIVE EXAMPLE 3, and a 2.0 mm thick decorative floor covering of EXAMPLE 3 of the present invention were measured and represented in the following Table 5.

TABLE 5

Indentation results on each structures

| Classification | 2.3 mm thick decorative floor covering of COMPARATIVE EXAMPLE 1 (foaming) | 1.8 mm thick decorative floor covering of COMPARATIVE EXAMPLE 3 (non-foaming) | 2.0 mm thick decorative floor covering of EXAMPLE 3 (non-foaming) |
|---|---|---|---|
| Indentation depth (mm) | 1.25 | 0.71 | 0.89 |

It could be confirmed from the results of the above Table 5 that there were 25.3% improved effects compared to a 1.8 mm conventional polyvinyl chloride resin non-foaming decorative floor covering although cushion characteristics were somewhat weaker than a 2.3 mm thick conventional foaming polyvinyl chloride cushion decorative floor covering.

Example 11

Temperature differences according to time of a 3.5 mm thick conventional vinyl cushion decorative floor covering of COMPARATIVE EXAMPLE 4 and a 2.0 mm thick decorative floor covering of EXAMPLE 3 of the present invention were measured and represented in the following Table 6.

TABLE 6

Heat accumulating effects on each structures

| | 3.5 mm thick vinyl cushion flooring of COMPARATIVE EXAMPLE 4 | | 2.0 mm thick decorative floor covering of EXAMPLE 3 | |
|---|---|---|---|---|
| Time lapsed | Temperature (° C.) | Temperature difference (° C.) | Temperature (° C.) | Temperature difference (° C.) |
| Product initial temperature | 54 | — | 49 | — |
| 1 hour | 42 | 12 | 39 | 10 |
| 2 hours | 35 | 19 | 31 | 18 |
| 3 hours | 31 | 23 | 27 | 22 |
| 4 hours | 27 | 27 | 25 | 24 |

It could be confirmed from heat accumulating effect results on each structure of the above Table 6 that a 2.0 mm thick decorative floor covering of the present invention had 3° C. or more heat insulating effects than a 3.5 mm thick conventional vinyl cushion decorative floor covering.

A decorative floor covering of the present invention is a decorative floor covering which has superior surface heat resistance, printing sharpness and realism, and it can be installed conveniently since not only can non-foamed polyvinyl chloride resin be used as a substrate layer, but also the weight of the floor covering is light when a light weight back layer is comprised under the substrate layer.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A decorative floor covering comprising:
   (i) a surface treated layer;
   (ii) a polyethylene terephthalate film layer;
   (iii) a polyvinyl chloride resin intermediate layer wherein the polyvinyl chloride resin intermediate layer is a sheet having a thickness of 0.1 to 0.2 mm manufactured by pressure rolling in a calendar a polyvinyl chloride resin composition comprising 100 parts of polyvinyl chloride resin, 25 to 50 weight parts of dioctyl phtalate, 50 to 150 weight parts of calcium carbonate, 3 to 5 weight parts of titanium oxide, and 2 to 5 weight parts of heat stabilizer;
   (iv) a polyvinyl chloride resin substrate layer wherein the polyvinyl chloride resin substrate layer is a non-foamed polyvinyl chloride sheet manufactured by kneading a polyvinyl chloride resin composition comprising 100 weight parts of polyvinyl chloride resin, a plasticizer of 30 to 50 weight parts of dioctyl phtalate, heat resistant stabilizers of 3 to 5 weight parts of barium-zinc based compound and 3 to 5 weight parts of epoxy compound, and fillers of 200 to 400 weight parts of calcium carbonate and 3 to 5 weight parts of pigment in a rolling mill having a temperature of 160 to 190° C., and pressure rolling it to a thickness of 0.8 to 1.3 mm;
   (v) an adhesive layer; and
   (vi) a light back layer.

2. A decorative floor covering in accordance with claim 1, wherein the polyethylene terephthalate film layer is a film in which a primer selected from the group consisting of polyvinyl acetate based, polyurethane acrylate based, and ethylene vinyl acetate based primers is coated to a film thickness of from 0.1 to 10 μm on at least a top and a bottom side of the polyethylene terephthalate film layer.

3. A decorative floor covering in accordance with claim 1, wherein a thickness of the polyethylene terephthalate film layer is from 10 to 100 μm.

4. A decorative floor covering in accordance with claim 1, wherein the polyvinyl chloride resin substrate layer is comprised of glass fiber scrim, or woven or nonwoven glass fiber.

5. A decorative floor covering in accordance with claim 1 further comprising a light back layer beneath the substrate layer.

6. A decorative floor covering in accordance with claim 5, wherein the light back layer comprises one or more layers selected from the group consisting of a cork balance layer, a wooden powder balance layer, and a fiber layer.

7. A decorative floor covering in accordance with claim 6, wherein the cork balance layer is a sheet which is cut to a thickness of 1.0 to 2.0 mm with a slicing machine after a cork layer of a natural tree is peeled off, pulverized to a particle size of 5 to 10 meshes, put into a large cylinder together with adhesive, and bonded by applying pressure.

8. A decorative floor covering in accordance with claim 6, wherein the wooden powder balance layer is a sheet which is rolled to a thickness of 0.8 to 1.0 mm using a two sets of pressure rolls after adding 100 to 150 weight parts of wooden powder having a particle size of 200 to 300 meshes, 3 to 5 weight parts of heat resistant stabilizer barium-zinc based compound, 1 to 3 weight parts of internal antiadditive stearic acid, 30 to 50 weight parts of plasticizer dioctyl phtalate, and 3 to 5 weight parts of pigment to 100 weight parts of polyvinyl chloride resin, and kneading all the components together.

9. A decorative floor covering in accordance with claim 6, wherein the fiber layer is selected from the group consisting of woven or unwoven polyester, woven or unwoven polypropylene, and woven or unwoven glass fiber, the woven thickness being from 10 s×10 s to 25 s×15 s, and the density being from 20×20 to 30×30 roll/inch.

10. A decorative floor covering in accordance with claim 1, wherein the surface treated layer of i) is a layer in which a surface treated layer composition comprising a resin selected from the group consisting of urethane acrylate, silicone acrylate, and epoxy acrylate is coated on the polyethylene terephthalate film layer, and cured with ultraviolet rays.

11. A decorative floor covering in accordance with claim 10, wherein the surface treated layer composition further comprises an acryl based or urethane based bead having a particle size of 5 to 20 μm.

12. A decorative floor covering in accordance with claim 1, wherein the total thickness of the i) surface treated layer, ii) polyethylene terephthalate film layer, iii) polyvinyl chloride resin intermediate layer, iv) polyvinyl chloride substrate layer, and v) adhesive layer is from 1 to 1.5 mm.

13. A decorative floor covering in accordance with claim 1, wherein the adhesive layer of v) is a sheet in which urethane resin, acrylic resin or vinyl acetate resin is rolled to a thickness of 0.03 to 0.2 mm using 4 calender rolls at a temperature of 80 to 160° C., an impregnated sheet, or a plastisol coating gel.

\* \* \* \* \*